(12) United States Patent
Chen et al.

(10) Patent No.: US 7,951,742 B2
(45) Date of Patent: May 31, 2011

(54) SELECTIVE CATALYTIC REDUCTION OF $N_2O$

(75) Inventors: James Chen, North Brunswick, NJ (US); Pascaline Tran, Holmdel, NJ (US); Michael Durilla, Howell, NJ (US); Stanley Mack, Madison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/208,569

(22) Filed: Sep. 11, 2008

(65) Prior Publication Data

US 2009/0011927 A1 Jan. 8, 2009

Related U.S. Application Data

(62) Division of application No. 09/804,328, filed on Mar. 12, 2001, now Pat. No. 7,438,878.

(51) Int. Cl.
*B01J 29/06* (2006.01)

(52) U.S. Cl. ....................................... 502/64; 423/239.1

(58) Field of Classification Search .................... 502/60, 502/64, 66; 423/239.1, 239.2
See application file for complete search history.

(56) References Cited

U.S. PATENT DOCUMENTS

| | | | |
|---|---|---|---|
| 4,571,329 A | 2/1986 | Kato et al. | |
| 4,961,917 A | 10/1990 | Byrne | |
| 5,024,981 A | 6/1991 | Speronello et al. | |
| 5,171,553 A | 12/1992 | Li et al. | |
| 5,200,162 A * | 4/1993 | Riley et al. | 423/239.1 |
| 5,407,652 A | 4/1995 | Swamy et al. | |
| 5,756,057 A * | 5/1998 | Tsuchitani et al. | 423/213.2 |
| 6,056,928 A * | 5/2000 | Fetzer et al. | 423/235 |

FOREIGN PATENT DOCUMENTS

| | | |
|---|---|---|
| EP | 0 541 008 A1 | 12/1993 |
| WO | WO 9710042 A1 * | 3/1997 |
| WO | WO 00/48715 | 8/2000 |
| WO | WO 01/51181 A1 | 7/2001 |

OTHER PUBLICATIONS

M.H. Thiemens et al., Nylon Production: An Unknown Source of Atmosphereic Nitrous Oxide, Science, 251 : 932-934 (1991).
M. Schiavello et al., Structure and Catalytic Activity of Iron Oxide and Magnesium Oxide Solid Solutions Part 2.-Catalytic Activity for $N_2O$ Decomposition, J. Chem. Soc. Faraday Trans. 1, 71(8): 1642-1648.
P. Porta et al., Structure and Catalytic Activity of $Co_x Mg_{1-x}Al_2O_4$ Spinel Solid Solutions Part 2.—Decomposition of $N_2O$, J. Chem Soc. Faraday Trans. 1, 74 (7): 1595-1603.
W.T. Reichle, Catalytic Reactions by Thermally Activated Synthetic, Anionic Clay Minerals, Journal Of Catalysis, 94: 547 (1985).
Breck, Zeolite Molecular Sieves, Structure Chemistry and Use, Chapter 7, Ion-Exchange Reaction and Zeolites, John Wiley and Sons, New York: 529 (1974).
PCT International Search Report —Completed Sep. 10, 2002 by Authorized Officer.

* cited by examiner

*Primary Examiner* — Edward M Johnson
(74) *Attorney, Agent, or Firm* — Scott S. Servilla; Diehl Servilla LLC; Melanie L. Brown

(57) ABSTRACT

A gas stream containing nitrous oxide and ammonia is contacted with a catalyst composition containing a zeolite. $N_2O$ is reduced to $N_2$ and $H_2O$ at low temperatures in a highly efficient manner. Ammonia-mediated reduction of nitrous oxide can be effectuated from gas streams having $N_2O$ concentrations as low as 1%. The gas stream may also contact a catalytic composition selective for the reduction of $NO_x$. In this way, $N_2O$ and $NO_x$ treatment may be effectuated in a single process stream.

14 Claims, 10 Drawing Sheets

FIG. 1  Fe/Beta Catalyst- Effect of NH3 on N2O Conversion

FIG. 2 Fe/Beta Catalyst- Effect of N2O on NH3 Conversion

FIG. 3  V/Ti Catalyst- Effect of NH3 on N2O Conversion

FIG. 4  V/Ti Catalyst- Effect of N2O on NH3 Conversion

FIG. 5 Pt/Au Catalyst- Effect of NH3 on N2O Conversion

FIG. 6 Pt/Au Catalyst- Effect of N2O on NH3 Conversion

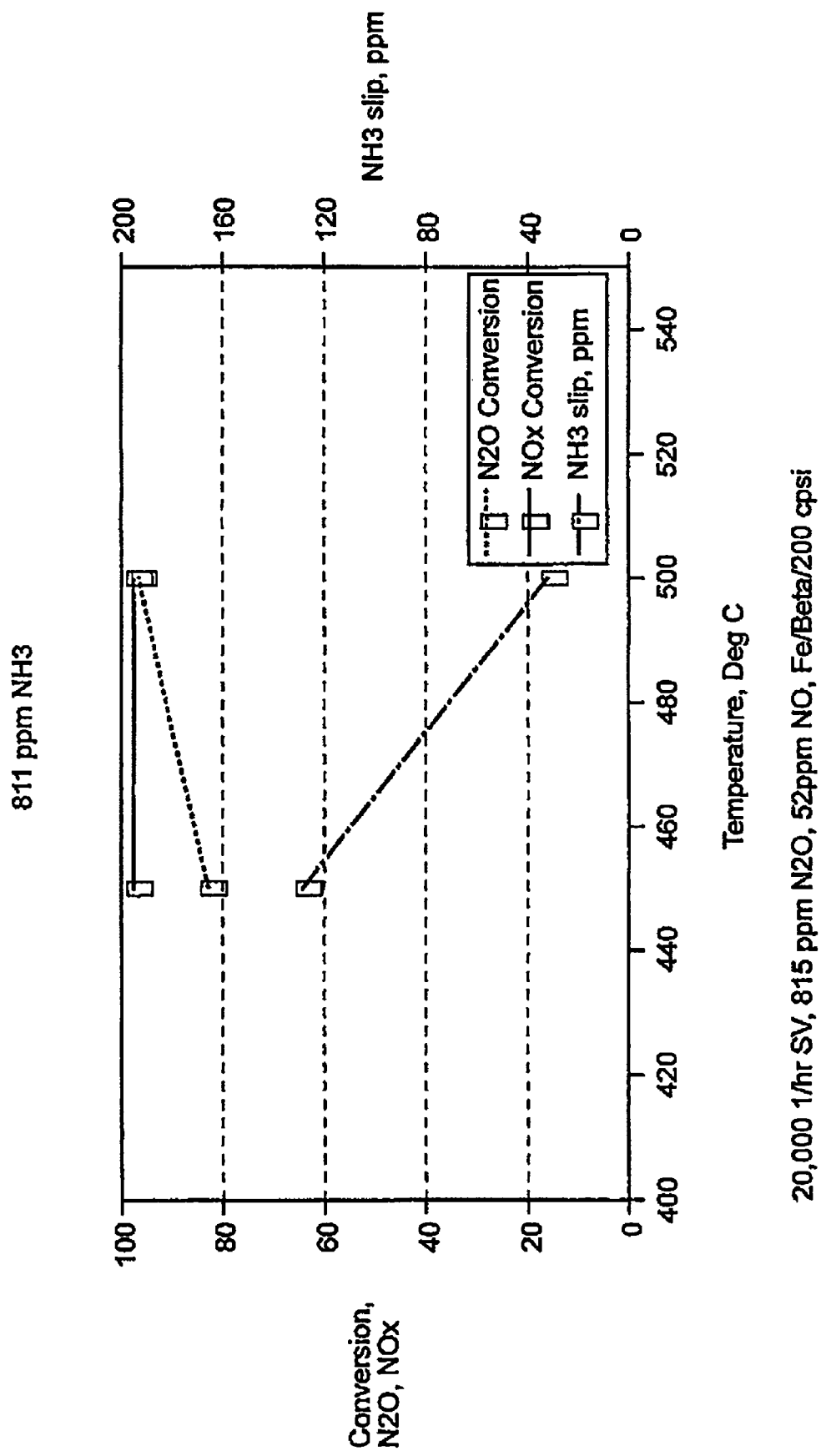
FIG. 8  Effect of NH3 on Conversions of N2O ad NOx over Fe/Beta

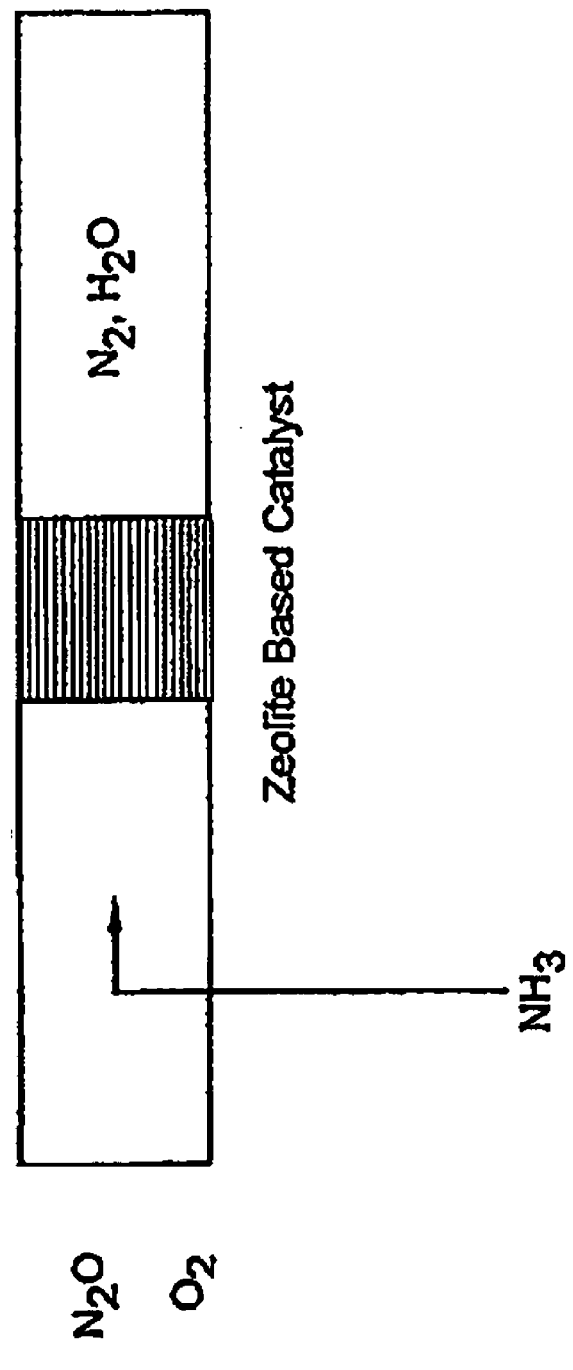
FIG. 9  Schematic of the apparatus for the N₂O control

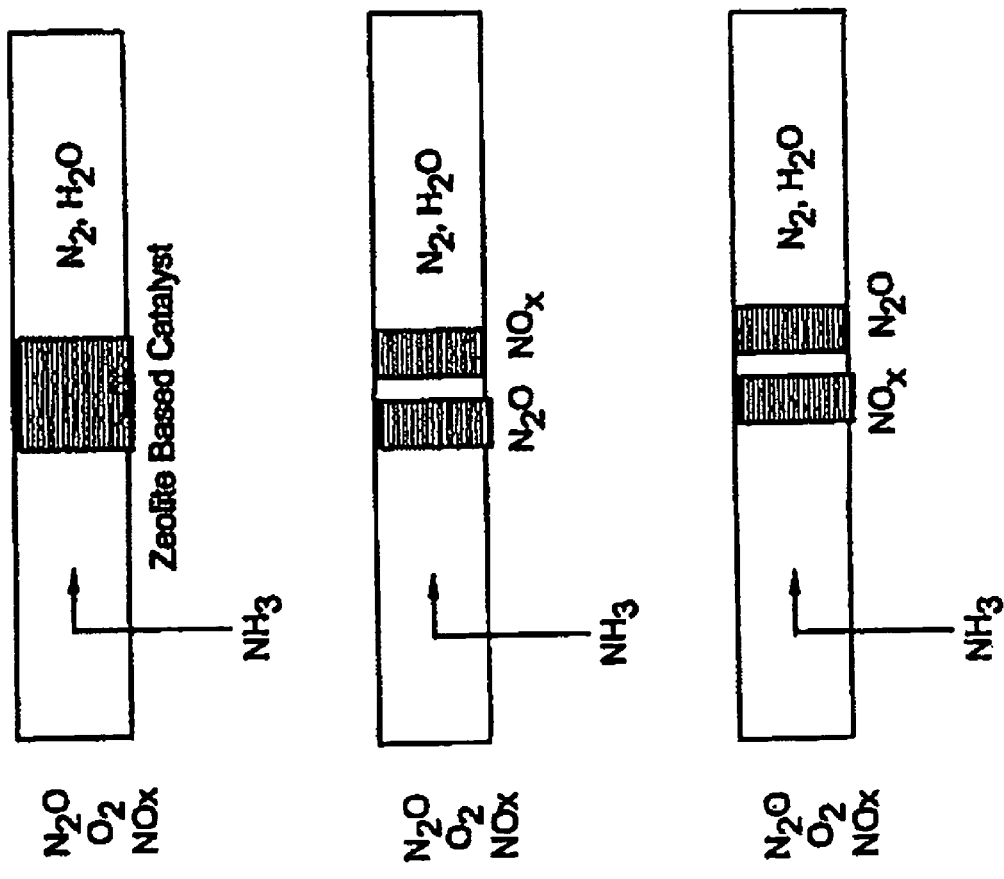
FIG. 10 Schematic of the apparatus for NOx and $N_2O$ control

SELECTIVE CATALYTIC REDUCTION OF $N_2O$

BACKGROUND OF THE INVENTION

1. Field of the Invention

The present invention is related to an improved method for the reduction of nitrous oxide; and more particularly, to ammonia-mediated reduction of nitrous oxide.

2. Description of the Prior Art

Nitrous oxide ($N_2O$) is not commonly considered an atmospheric pollutant and has not been considered a constituent of the gaseous pollutants collectively referred to as nitrogen oxides ($NO_x$) which have received wide attention as pollutants harmful to the environment. However, recent studies indicate that $N_2O$ in the Earth's atmosphere may be increasing at a rate of about 0.2% per year and that this increase appears to be caused by anthropogenic activity.

$N_2O$ is a major stratospheric source of NO, is believed to be involved in destroying the ozone layer and is recognized to be a greenhouse gas. Because $N_2O$ has an atmospheric lifetime of approximately 150 years, researchers are attempting to identify sources of the pollutant and to limit further production of the harmful gas. Recent reports such as an article by Thiemens and Trogler, *Science*, 251 (1991) 932 suggest that various industrial processes significantly contribute to the increased levels of $N_2O$ found in the Earth's atmosphere.

For example, nitrous oxide is a by-product formed during the manufacture of monomers used in producing 6,6- and 6,12-nylon. Nylon polymers are typically formed by subjecting a dicarboxylic acid and a diamine to a condensation polymerization reaction. The most widely used dicarboxylic acid, adipic acid, is prepared primarily by oxidizing cyclohexane in air to form a cyclohexanol/cyclohexanone mixture followed by oxidizing such mixture with $HNO_3$ to form adipic acid and $N_2O$. Thiemens and Trogler calculate that about 1 mol of $N_2O$ per mole of adipic acid is formed as a side product in adipic acid processes. Assuming that $2.2 \times 10^9$ kg of adipic acid are produced globally per year, about $1.5 \times 10^{10}$ mol $yr^{-1}$ of $N_2O$ by-product or 10% of the annual output of atmospheric $N_2O$ can be attributed to this single process. Also, for many industrial processes, $N_2O$ may be co-present with nitrogen oxides, $NO_x$ (NO and $NO_2$), in the effluent gases.

M. Schiavello and coworkers, (*J. Chem. Soc. Faraday Trans.* 1, 71(8), 1642-8) studied various magnesium oxide-iron oxides and magnesium oxide-iron oxide-lithium oxide systems as $N_2O$ decomposition catalysts. While magnesium oxide-iron oxide samples which were fired in air and which contained $Mge_2O_4$ demonstrated low activity, similar samples fired under reducing atmospheres and containing $Fe^{2+}$ in solid solution demonstrated greater activity. The researchers concluded that $Fe^{3+}$ ions in the ferrite phase are not catalytically active toward the subject reaction whereas $Fe^{3+}$ ions contained in MgO together with $Li^+$ are catalytically active when the ratio of lithium to iron is less than 1.

P. Porta and coworkers (*J. Chem. Soc. Faraday Trans* 1, 74(7), 1595-603) studied the structure and catalytic activity of $Co_xMg_{1-x}Al_2O_4$ spinel solid solutions for use as catalysts in decomposing $N_2O$ into gaseous nitrogen and oxygen. The catalytic activity per cobalt ion in various $N_2O$ decomposition catalysts was found to increase with increasing dilution in MgO. The distribution of cobalt ions among octahedral and tetrahedral sites in the spinel structure of $Co_xMg_{1-x}Al_2O_4$ was found to vary with temperature and the fraction of cobalt ions in octahedral sites was found to increase with increasing quenching temperature. The researchers concluded that catalytic activity generally increases as a greater amount of cobalt ions is incorporated into octahedral sites in the structure.

W. Reichle (*Journal of Catalysis* 94 (1985) 547) reported that various anionic clay minerals belonging to the pyroaurite-sjogrenite group, such as hydrotalcite $(Mg_6Al_2(OH)_{16}(CO_3^{2-}).4H_2O$ can be thermally decomposed to form a product which is a useful catalyst for vapor-phase aldol condensations. Replacement of Mg by Fe, Co, Ni and Zn and/or replacement of Al by Fe and Cr also results in isomorphous double hydroxides which, on heat treatment, are rendered catalytically active. The reference also states that the activity of the catalyst is strongly affected by the temperature at which the hydrotalcite is activated.

Commonly owned U.S. Pat. No. 5,171,553 discloses a highly efficient, commercially viable process for removing $N_2O$ from gaseous mixtures. The process utilizes catalysts comprising a crystalline zeolite which, at least in part, comprise five membered rings having a structure type selected from the group consisting of BETA, MOR, MUI, MEL and FER wherein the crystalline zeolite has been at least partially ion-exchanged with a metal selected from the group consisting of copper, cobalt, rhodium, iridium, ruthenium and palladium.

Likewise, commonly owned U.S. Pat. No. 5,407,652 discloses an efficient catalytic pollution control process for removing $N_2O$ from gaseous mixtures. The process utilizes catalysts derived from anionic clay minerals such as hydrocalcites, sjogrenites and pyroaurites which, after appropriate heat activation, provide superior $N_2O$ decomposition activity.

While the prior art has shown an awareness of the decomposition of $N_2O$ into its respective components, industry urgently needs to develop enhanced catalytic processes for destroying $N_2O$ emissions prior to the venting of commercial process effluent streams into the atmosphere. This need is particularly critical with respect to effluent streams containing low levels of this contaminant. In addition, methods are needed to remove this contaminant from engine exhaust streams. It would be particularly useful if the catalytic decomposition of $N_2O$ could be combined with reduction of $NO_x$ so as to economically and efficiently remove these pollutants from both industrial effluent streams and engine exhaust streams.

SUMMARY OF THE INVENTION

In accordance with the present invention, there is provided a method for ammonia-mediated reduction of nitrous oxide comprising contacting a gas stream containing nitrous oxide and ammonia with a catalyst composition comprising a zeolite. Advantageously, $N_2O$ is reduced to $N_2$ and $H_2O$ at lower temperatures and with greater efficiency than heretofore known in the art. In this way, the present invention provides an economical and reliable control method for nitrous oxide pollution.

In another aspect of the invention there is provided a method for ammonia-mediated $N_2O$ and $NO_x$ reduction comprising contacting a gas stream containing ammonia with a catalyst composition containing an upstream catalyst and a downstream catalyst as sensed relative to the sequence of flow of the gaseous stream through the catalyst wherein the upstream catalyst is selective for the reduction of $NO_x$ and the downstream catalyst is selective for the reduction of $N_2O$. Alternatively, this catalyst configuration may be reversed. Advantageously, the upstream and downstream catalysts can comprise the same material. The ability to control $N_2O$ and $NO_x$ in a single process stream and, where desired, with a single catalytic material, results in significant cost savings.

Such a combined process is particularly useful in industries and in engine exhaust streams where $N_2O$ and $NO_x$ are present in the outgas.

BRIEF DESCRIPTION OF THE DRAWINGS

The invention will be more fully understood and further advantages will become apparent when reference is had to the following detailed description and the accompanying drawings, in which:

FIG. 8 is a graph of laboratory results showing the use of a zeolite catalyst to achieve reduction for both $NO_x$ and $N_2O$ gases by introducing $NH_3$ into the gas stream;

FIG. 9 is a schematic of the apparatus for the control of $N_2O$ gas; and

FIG. 10 is a schematic of the apparatus for the control of $N_2O$ and $NO_x$.

DETAILED DESCRIPTION OF THE INVENTION

Figure 1:
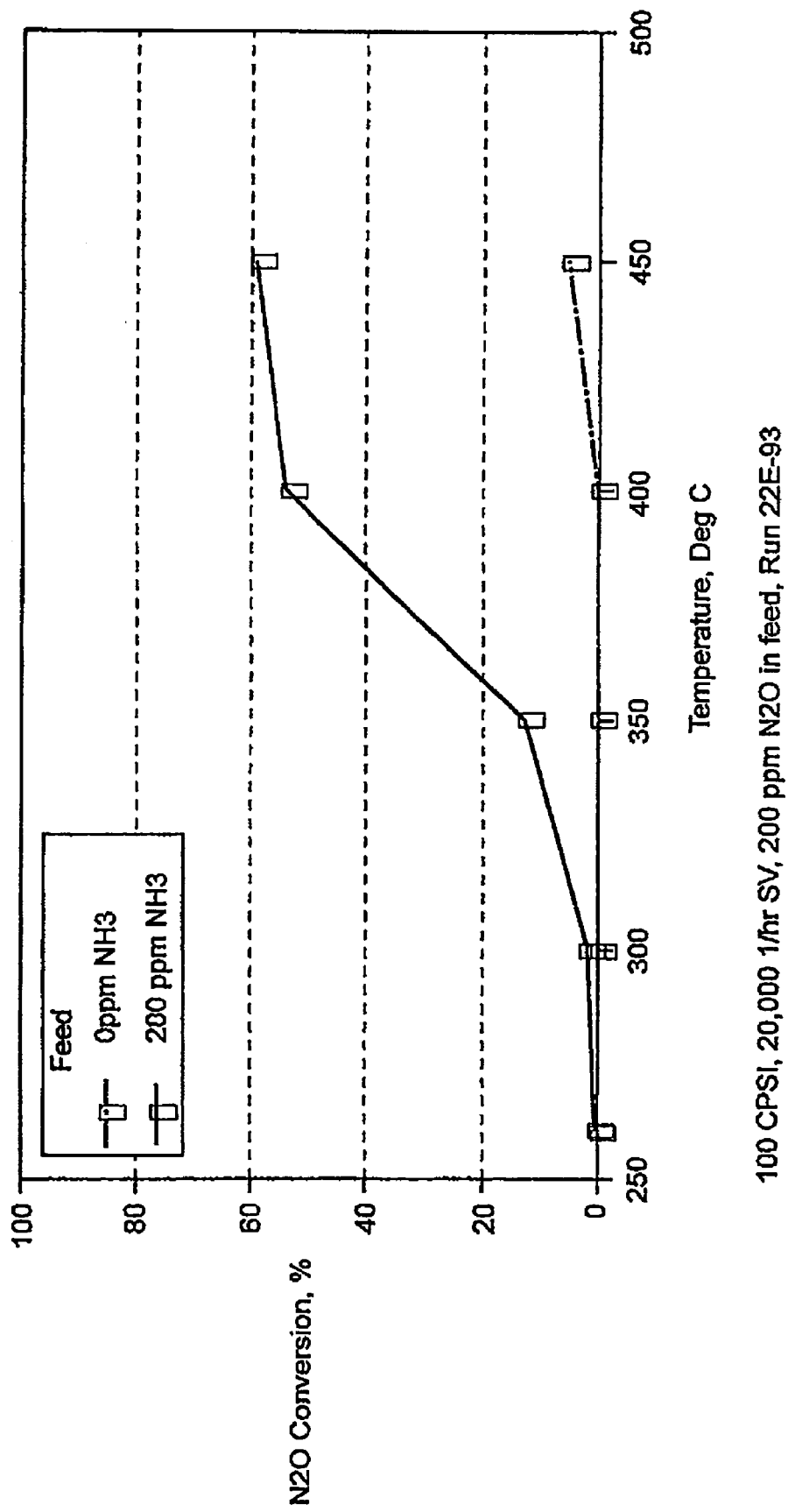
FIG. 1 is a graph of laboratory data showing % $N_2O$ conversion versus catalyst temperature for a zeolite based Fe-exchanged catalyst.

The present invention relates to a highly efficient catalytic method for converting nitrous oxide ($N_2O$) into environmentally safe products, namely gaseous nitrogen and water. The method is based on the surprising discovery that adding ammonia to a gas stream containing $N_2O$ and passing the mixture over a zeolite catalyst composition results in enhanced $N_2O$ reduction than otherwise known in the art. Specifically, the $N_2O$ decomposition rate is enhanced when ammonia is introduced to the gas stream. In so doing, the introduced ammonia is also converted into $N_2$ and water, with its own conversion rate increased by the presence of $N_2O$. As a result of this enhanced $N_2O$ decomposition rate, the method is capable of reducing $N_2O$ at much lower temperatures and/or lower catalyst volumes than presently required. Moreover, the enhanced $N_2O$ removal offered by the present invention permits the removal of low levels of $N_2O$ (i.e., less than 1% $N_2O$) from process streams. The method can also be combined with selective catalytic reduction (SCR) of nitrous oxides ($NO_x$) to achieve simultaneous removal of $N_2O$ and $NO_x$. This is particularly advantageous for internal combustion engines or industrial processes where $N_2O$ and NO, are both present in the outgas.

In accordance with the present invention, there is provided a method for the reduction of a gas stream containing nitrous oxide which comprises contacting a gas stream containing $N_2O$ with ammonia over a catalyst composition comprising a zeolite in order to catalyze the reduction of the $N_2O$ with ammonia. Such gaseous streams, for example, the products of combustion of internal combustion engines, boilers, and the nitric acid manufacturing process often inherently contain substantial amounts of oxygen. These exhaust gases contain from about 2 to 15 volume percent oxygen and from about 20 to 100,000 volume parts per million (ppm) $N_2O$. Zeolites, and in particular, metal-promoted zeolites can be used to promote the reaction of ammonia with $N_2O$ to form nitrogen and $H_2O$ selectively over a competing reaction of oxygen and ammonia.

It is desirable in the method to provide sufficient ammonia to react completely with the $N_2O$ present in order to drive the reaction to completion. However, in practice, significant excess ammonia is normally not provided because the discharge of unreacted ammonia from the catalyst to the atmosphere would itself engender an air pollution problem. Accordingly, the ratio of ammonia to $N_2O$ in the gas stream should range up to about 2.0 ppm $NH_3$/ppm $N_2O$ based on the total volume of the gas stream in order to impact $N_2O$ reduction. The $NH_3/N_2O$ ratio should be at least 0.5, with the most preferred ratio being from about 0.8 to about 1.0 $NH_3/N_2O$. Addition of the foregoing amounts of ammonia to the gas stream advantageously enhances $N_2O$ conversion over process streams lacking ammonia.

As previously indicated, the method of the present invention is useful for ammonia-mediated $N_2O$ reduction at lower processing temperatures than previously known in the art. In accordance with the present invention, $N_2O$ reduction can be enhanced over conventional processes at temperatures of greater than 250° C. and preferably those ranging from 350° C. to 600° C. and most preferably 450° C. to 600° C.

Generally, any suitable zeolitic material may be utilized in the catalyst compositions of the invention. Preferably, the zeolitic materials are ion-exchanged with Fe, Cu, Co, Ce, Pt, Rh, Pd, Tr, Mg. Ion-exchanging the zeolitic materials serves to enhance the catalytic activity toward and selectivity for the reaction between $NH_3$ and $N_2O$. Useful zeolites for practice of the present invention include crystalline zeolites which, at least in part, comprise five membered rings having a structure type selected from the group consisting of BETA, MOR, MFI, ZSM, MEL, FER and Y. Of these, BETA, ZSM, MOR and Y are particularly preferred, and BETA is the most preferred. Suitable ion exchange compounds include Fe, Cu, Co, Ce, Pt, Rh, Pd, Ir, and Mg, with Fe, Cu, Co, Ce, Pd, Rh and Fe, Ce, Cu, Co and combinations thereof most preferred. Such ion-exchange techniques are well known in the art and are reviewed in Breck, *Zeolite Molecular Sieves, Structure, Chemistry and Use*, Chapter 7, Ion-Exchange Reactions and Zeolites, beginning on page 529, published by John Wiley and Sons, New York, 1974 which is expressly incorporated herein by reference.

Because the invention is capable of reducing $N_2O$ at lower temperatures, removal efficiencies of >90% can be attained at temperatures of 300° C. to 600° C., with removal efficiency calculated as [[(inlet $N_2O$ (moles)−outlet $N_2O$ (moles))/inlet $N_2O$ moles]*100]. In addition, the method of the present invention can also remove small quantities of $N_2O$ from gas streams having low levels of this contaminant; for example, less than 1%. Advantageously, the method of the present invention can remove $N_2O$ from gas streams containing as much as about 5000 ppm $N_2O$ to as low as 20 ppm at these temperatures.

The method described herein may also be combined with selective catalytic reduction of $NO_x$ to achieve simultaneous removal of $NO_x$ and $N_2O$ from a single process stream. For example, many industrial process streams and engine exhausts contain $NO_x$ and $N_2O$. Prior to the present invention, there was no suitable method for controlling both of these contaminants in a single process stream, due to the fact that most SCR catalysts are operated at less than 550° C. and no suitable catalyst was found to destroy $N_2O$ effectively at those temperatures.

Where it is desired to simultaneously remove $NO_x$ and $N_2O$ from a single process stream, ammonia is introduced into the process stream upstream of the catalyst bed. The catalyst bed contains an upstream catalyst and a downstream catalyst. Three arrangements can be made to achieve the simultaneous removal. In one arrangement, the upstream and downstream catalysts comprise the same material which can promote both the selective reduction reaction of $NO_x$ and reduction of $N_2O$. For this arrangement, a zeolite-based SCR catalyst, such as Fe/Beta, can be very effective. The ability to control $NO_x$ and $N_2O$ in the same reactor will result in significant savings in control costs. For this arrangement, the exhaust temperature is preferably in the range of 350° C. to 600° C. The second arrangement comprises an upstream catalyst which is selective for the reduction of $N_2O$ and a downstream catalyst selective for the reduction of $NO_x$. In this arrangement, the ammonia required for $N_2O$ and $NO_x$ removal is introduced before the upstream $N_2O$ catalyst, which gives higher $NH_3$ concentration to further enhance the $N_2O$ removal rate. The unconverted ammonia is then reacted with $NO_x$ over the downstream SCR catalyst and converted to $N_2$ and water. This arrangement is advantageous for streams that contain a high concentration of $N_2O$ relative to $NO_x$, since the downstream SCR bed is used to convert the low level of $NO_x$ and $NH_3$. The third arrangement comprises an upstream catalyst which is selective for the reduction of $NO_x$ (SCR $NO_x$) and a downstream catalyst which is selective for reduction of $N_2O$. This arrangement is advantageous for treating streams that contain high concentrations of NO, relative to $N_2O$. The unconverted ammonia coming off of the catalyst selective for the reduction of $NO_x$ is used to promote reduction of $N_2O$ over the downstream catalyst. Methods and suitable catalytic materials for removing $NO_x$ are well known in the art and are described in detail in commonly owned U.S. Pat. No. 5,024,981 of Barry K. Speronello et al., entitled "Staged Metal-Promoted Zeolite Catalysts and Method for Catalytic Reduction of Nitrogen Oxides Using Same," and commonly owned U.S. Pat. No. 4,961,917 of John W. Byrne entitled "Zeolite Catalysts and Method for Reduction of Nitrogen Oxides With Ammonia Using Same," both of which are expressly incorporated herein by reference.

In this aspect of the invention, the catalysts are arranged in at least two zones in which one zone contains a catalyst selective for the reduction of $NO_x$, and the other zone contains a zeolite catalyst selective for the reduction of $N_2O$. Any suitable form of the catalyst may be used in these and other aspects of the invention, such as a monolithic honeycomb-type body containing a plurality of fine parallel gas flow passages extending therethrough, the walls of which are coated with the catalytic material. Typically, such monolithic bodies are made of a refractory ceramic material such as cordierite, mullite or aluminia, and the catalytic material coating the fine gas flow passages is contacted by the gaseous stream as it flows through the gas flow passages. Separate monolith bodies may be used for each of the zones. As indicated above, each of the zones preferably comprises the same catalytic material.

The catalyst may also take the form of a packed bed of pellets, tablets, extrudates or other particles of shaped pieces, such as plates, saddles, tubes or the like. The physical configuration of the catalyst used in a given case will depend on a number of factors such as the space available for the catalytic reactor, the activity of the catalytic material utilized, and the permitted or desired amount of pressure drop across the catalyst bed; for example, where the method is used to treat engine exhausts. A preferred physical configuration of the catalyst is one which provides parallel flow passageways for the gas, such as those found in the above-described honeycomb-type catalysts. Other arrangements providing such parallel flow passageways include the use of parallel plates or stacked tubes. Because of its ease of handling and installation as well as good mass transfer characteristics relative to other parallel passage configurations, a highly preferred physical configuration of the catalysts of the invention is a monolithic honeycomb member having relatively high cell (flow passageway) density of approximately 60 cells or more per square inch of end face of the honeycomb member. The walls defining the gas flow passages (or cells) are desirably as thin as possible consistent with the requisite mechanical strength of the honeycomb. Catalysts used in the invention may take the form of a monolithic honeycomb carrier, the gas flow passages of which comprise or are coated with separate zeolite catalytic compositions as described above. For example, a catalytically inert honeycomb member, such as a cordierite carrier, may be coated with a washcoat of fine particles of a catalyst selective for the reduction of $N_2O$. Alternatively, a powder of a catalyst selective for the reduction of $N_2O$ may be mixed with a binder and extruded into the honeycomb configuration. In another approach, the catalytic material may be formed in situ by preparing the honeycomb structure from a zeolitic precursor raw material which is then treated to form the zeolitic material as part of the honeycomb structure.

The following examples are presented to provide a more complete understanding of the invention. The specific techniques, conditions, materials, proportions and reported data set forth to illustrate the principles and practice of the invention are exemplary and should not be construed as limiting the scope of the invention.

Example 1

Synthesis of $N_2O$ Reduction Catalysts

A zeolite catalyst was prepared according to the following general procedure. Zeolite Beta powder was prepared via the synthetic procedures disclosed in Example 1 (Batch 1) of commonly owned U.S. Pat. No. 4,961,917 of John W. Byrne, which is expressly incorporated by reference herein. The powder was then ion-exchanged with Fe by dispersing 212.5 g of zeolite Beta powder in a preheated, 70° C. solution consisting of 1000 g of deionized water and 25.5 g of iron sulfate heptahydrate. The preparation was mixed for 1 hour, after which the zeolite powder was filtered from the solution followed by water washing to remove residual sulfate. The filtered cake was then mixed with deionized water in the proportion 40% zeolite/60% water by weight, and the mixture was placed in a high shear mixer to form a washcoat slurry containing zeolite Fe/Beta with a particle size 90% less than 20 μm. A monolith support of cordierite containing 100 cells per square inch of cross section was dipped into the washcoat slurry. After calcination at 400° C., the support contained 1.5 g of zeolite re/Beta/in$^3$.

Example 2

Catalytic Decomposition of $N_2O$

The following general procedure was utilized for catalytically converting $N_2O$ with ammonia to gaseous nitrogen and water A core sample of Fe/Beta on 100 CPSI honeycomb was loaded into a 1 inch reactor. A gas stream consisting of varied concentrations of $N_2O$ and ammonia, 10% $O_2$, 10% $H_2O$, and balanced with $N_2$ was fed through the catalyst at a flow rate equivalent to 20,000 hour$^{-1}$ space velocity ("SV"), which is defined as [(gas flow rate at 25° C. (liters/hr))/(catalyst volume (liters))]. The disappearance of both $N_2O$ and ammonia across the catalyst were measured by taking gas samples before and after passing over the catalyst. The gas samples were then measured by on-line $N_2O$ and ammonia infrared analyzers, such as Sieman $N_2O$ (Ultramat 5E) and NH3 (Ultramat 5F) analyzers. These conversions were then measured over a temperature range of 250° C. to 450° C. The tests were conducted with varying concentrations of $N_2O$, and ammonia: (a) 200 ppm $N_2O$, 0 ppm ammonia; (b) 200 ppm $N_2O$, 200 ppm ammonia; and (c) 0 ppm $N_2O$, 200 ppm ammonia. As illustrated in FIG. 1, $N_2O$ conversion was low (i.e., 10%) at temperatures ranging from 250° C. to 450° C. in the absence of ammonia. With 200 ppm ammonia present, $N_2O$ conversion increased substantially with increasing temperature. By adding ammonia, $N_2O$ conversion increased significantly at temperatures greater than 300° C. These data demonstrate that the presence of ammonia substantially increased the reduction rate of $N_2O$, even at low temperatures (i.e., above 250° C.).

Figure 2:
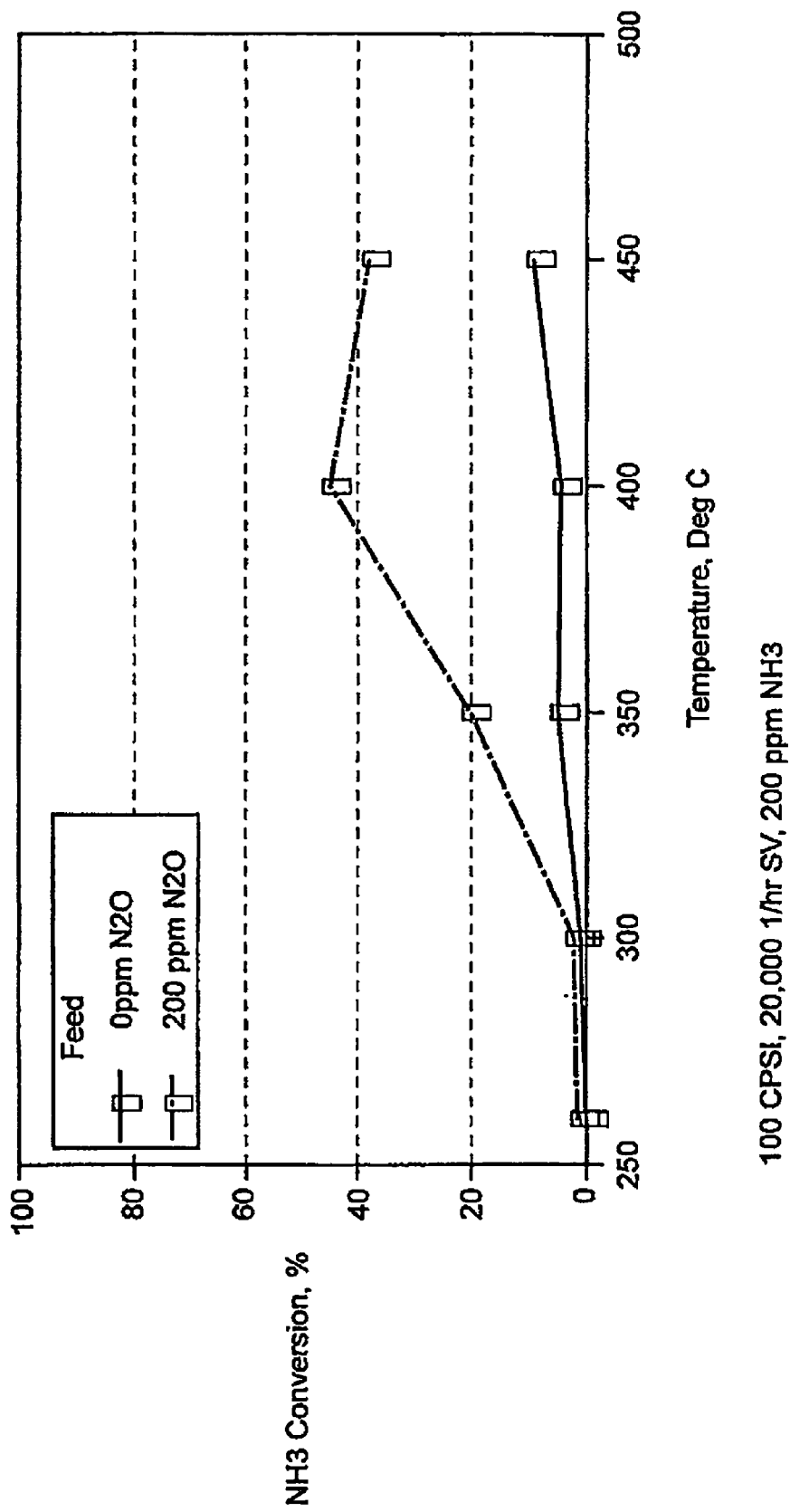
FIG. 2 is a graph depicting % ammonia conversion versus catalyst temperature for the same test series as in FIG. 1.

FIG. 2 illustrates the disappearance of ammonia. In the absence of $N_2O$, ammonia conversion was very low, indicating that very little ammonia was oxidized. However, in the presence of $N_2O$, the ammonia disappearance rate increased substantially. Thus, it is apparent that ammonia and $N_2O$ mutually enhance the conversion of each other to $N_2$ and $H_2O$ over a zeolite-based catalyst.

Example 3

Effect of a Zeolite Catalyst on Ammonia-Mediated $N_2O$ Reduction

In order to ascertain if ammonia-mediated $N_2O$ reduction is unique to zeolite catalysts, the procedures described in Example 2 were conducted utilizing two other catalytic compositions, $V_2O_5/TiO_2$, and Pt/Au. These compositions were obtained as follows:

$V_2O_5/TiO_2$ 130.8 g of citric acid was mixed with 1000 g of deionized water, and the mixture was heated to 80° C. to dissolve the citric acid. This solution was then combined in a mixing tank with 37.5 g of ammonium metavanadate, followed by an additional 700 g of deionized water. 1425 g of $TiO_2$ powder having a BET surface area of 100 m$^2$/g was added to the solution to obtain a 2% $V_2O_5/TiO_2$ washcoat slurry. A monolith support of cordierite containing 100 cells per square inch of cross section was dipped into the washcoat slurry. After calcination at 400° C., the support contained 1.5 g of $V_2O_5$/$TiO_2$ catalyst powder/in$^3$.

Pt/Au 177 g of gamma alumina powder having a BET surface area of 150 m$^2$/g was ball milled with deionized water and acetic acid to form a 50% solid slurry. The slurry was then placed in a dispersion tank and combined with 0.83 g of Pt equivalent amine-solubilized aqueous platinum hydroxide ($H_2Pt(OH)_6$) solution and 0.17 g of Au equivalent aqueous ($HAuCl_4 \cdot 3H_2O$) solution. A monolith support of cordierite containing 100 cells per square inch of cross section was dipped into the washcoat slurry. After calcination at 400° C., the support contained 1.7 g of $Al_2O_3$/in$^3$, 40 g of Pt/ft$^3$, and 8 g of Au/ft$^3$.

Figure 3:
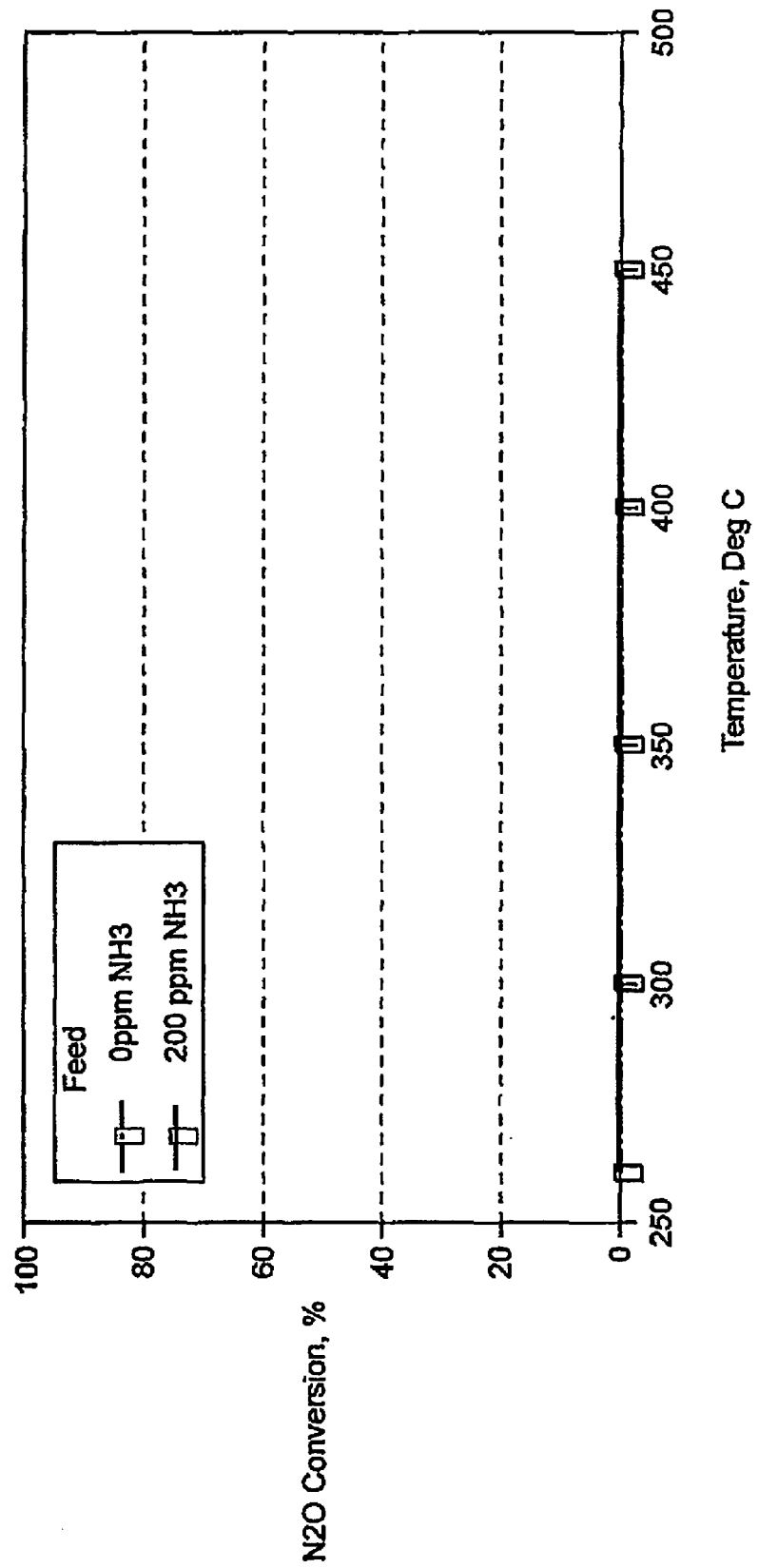
FIG. 3 is a graph depicting % $N_2O$ conversion versus catalyst temperature for a $V_2O_5/TiO_2$ catalyst.
Figure 4:
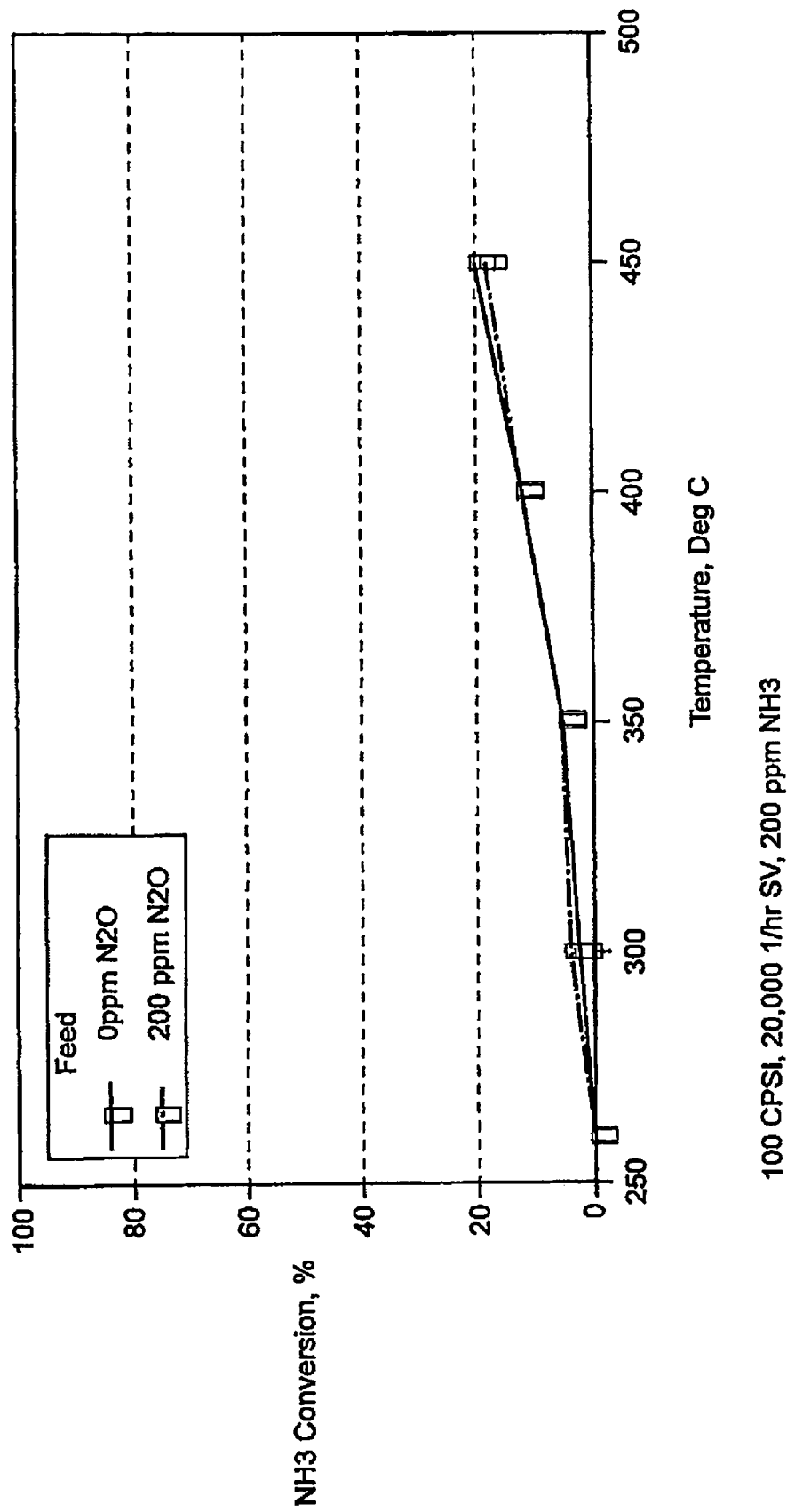
FIG. 4 is a graph depicting % ammonia conversion versus catalyst temperature for a $V_2O_5/TiO_2$ catalyst.

FIG. 3 illustrates that for the $V_2O_5/TiO_2$ catalyst, there was very little $N_2O$ reduction over the tested temperature range, with or without the presence of ammonia. Unlike the zeolite catalyst, the $V_2O_5/TiO_2$ catalyst did not show any activity for $N_2O$. FIG. 4 demonstrates that ammonia conversion is not affected by the presence of $N_2O$. In contrast to the zeolite catalyst, the reduction rate of $N_2O$ over the $V_2O_5/TiO_2$ catalyst could not be promoted by injecting ammonia into the gas stream. These results demonstrate that the $V_2O_5/TiO_2$ catalyst does little to foster the interaction between $N_2O$ and ammonia. Also, even though the $V_2O_5/TiO_2$ catalyst converted some ammonia at temperatures in the 350° C. to 450° C. range, the conversion was not increased when $N_2O$ was present in the gas stream. These results show that the mutually enhanced conversion of $NH_3$ and $N_2O$ to $N_2$ and $H_2O$ is specific to the unique catalytic properties of the zeolite catalyst. It is clear that the combination of ammonia addition and the use of a zeolite-based catalyst is essential to enhance the $N_2O$ removal rate.

Figure 5:
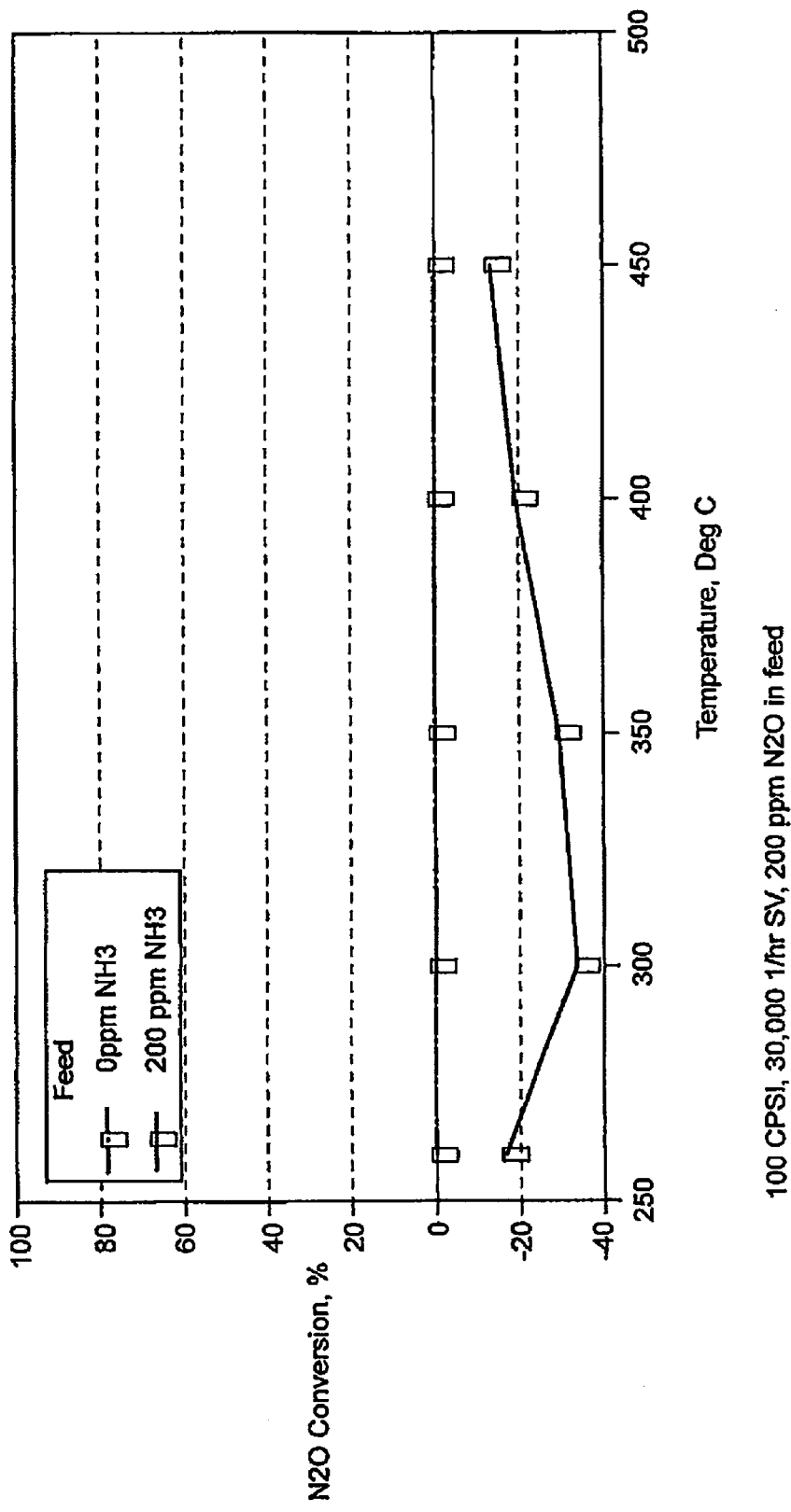
FIG. 5 is a graph depicting % $N_2O$ conversion versus catalyst temperature for a Pt/Au catalyst.
Figure 6:
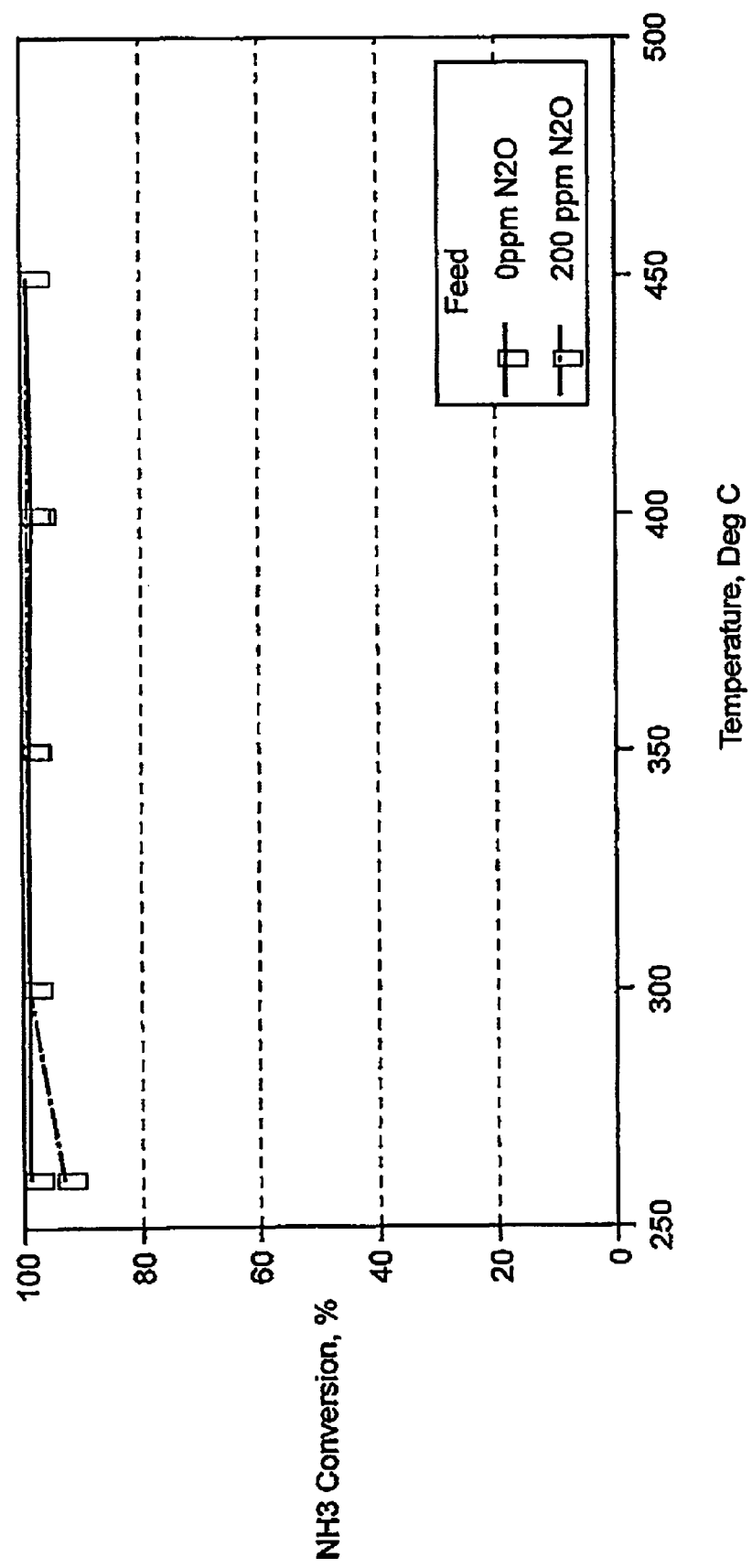
FIG. 6 is a graph depicting % ammonia conversion versus catalyst temperature for a Pt/Au catalyst.

FIGS. 5 and 6 are graphs on $N_2O$ and ammonia conversions, respectively, for a Pt/Au catalyst. As shown in these figures, the Pt based catalyst was not active to decompose $N_2O$, but was very active to oxidize ammonia. When ammonia and $N_2O$ are co-present in an oxidizing environment, the $N_2O$ conversion could become negative, indicating that some $N_2O$ was formed through the ammonia oxidation reaction. Thus, for this catalyst, the presence of ammonia not only fails to enhance $N_2O$ conversion, but also negatively affects $N_2O$ removal efficiency.

Figure 7:
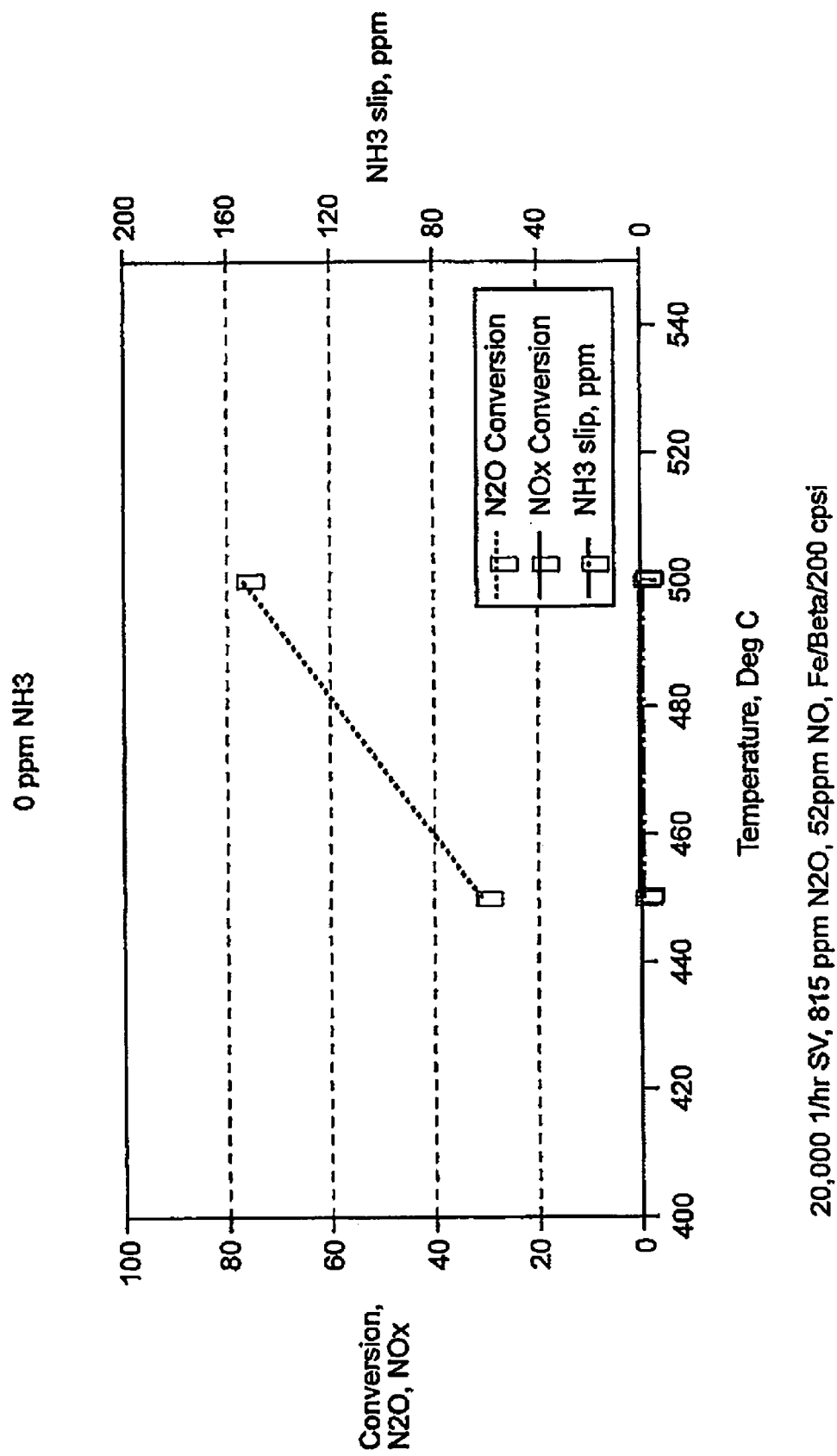
FIG. 7 is a graph of laboratory results showing the use of a zeolite catalyst to remove $NO_x$ and $N_2O$ in the absence of NH3.

FIGS. 7 and 8 are graphs of laboratory results showing the use of zeolite catalysts to achieve reduction for both $NO_x$ and $N_2O$ gases by introducing ammonia into the gas stream. For this test, the inlet gas contained 815 ppm $N_2O$ and 52 ppm $NO_x$. The conversions of $N_2O$ and $NO_x$ across a Fe/Beta catalyst were measured at 450° C. and 500° C. FIG. 7 shows that with no ammonia, there was no $NO_x$ conversion, and the $N_2O$ conversions were 30% and 78%, respectively, at 450° C. and 500° C. FIG. 8 shows that by introducing 811 ppm $NH_3$ to the gas stream, both $NO_x$ and $N_2O$ conversions were increased substantially. For $NO_x$ removal, greater than 98% conversion was achieved at both temperatures. For $N_2O$ removal, conversion was increased to 80% at 450° C. and 99% at 500° C. These results demonstrate that the zeolite catalyst is very active to promote the selective catalytic reduction of $NO_x$ with ammonia to form $N_2$ and water. Additionally, the combination of $NH_3$ and this zeolite catalyst substantially improved the $N_2O$ conversion efficiency at the lower temperature.

FIG. 9 is a schematic of the apparatus for the control of $N_2O$ gas. In this schematic, ammonia is introduced to a gaseous stream containing $N_2O$ at a ratio of about 1:1. This stream is then passed through a zeolite-based catalyst, which promotes the mutually enhanced removal rates of $N_2O$ and $NH_3$.

FIG. 10 is a schematic of the apparatus for the simultaneous control of $N_2O$ and $NO_x$. In this schematic, the gaseous stream is introduced with sufficient quantity of ammonia. This stream is then passed through a zeolite-based catalyst which promotes the mutually enhanced rates of $N_2O$ and ammonia removal, as well as the selective catalytic reduction of $NO_x$.

Having thus described the invention in detail, it will be recognized that such detail need not be strictly adhered to but that various changes and modifications may suggest themselves to one skilled in the art, all falling within the scope of the invention, as defined by the subjoined claims.

The invention claimed is:

1. An apparatus for ammonia-mediated removal of $N_2O$ from a gas stream comprising a source of ammonia upstream of a catalyst composition comprising a BETA zeolite catalyst selective for the reduction of $N_2O$, wherein ammonia is provided to the gas stream at a ratio of up to 2.0 ppm $NH_3$/ppm $N_2O$ based on a total volume of the gas stream.

2. The apparatus of claim 1, wherein the catalyst composition comprises at least two zones, at least one of the zones comprising a catalyst material selective for the reduction of NOx and at least one other zone comprising a catalyst material selective for the reduction of $N_2O$.

3. The apparatus of claim 2, wherein the two zones have the same catalyst composition.

4. The apparatus of claim 2, wherein the two zones have different catalyst compositions.

5. The apparatus of claim 4, wherein the zone comprising the catalyst material selective for the reduction of NOx is upstream of the zone comprising the catalyst material selective for the reduction of $N_2O$.

6. The apparatus of claim 4, wherein the zone comprising the catalyst material selective for the reduction of NOx is downstream of the zone comprising the catalyst material selective for the reduction of $N_2O$.

7. The apparatus of claim 1, wherein the BETA zeolite catalyst is promoted with at least one type of ion selected from the group consisting of Fe, Cu, Co, Ce, Pt, Rh, Pd, Ir, Mg and combinations thereof.

8. The apparatus of claim 7, wherein the BETA zeolite catalyst is promoted with Fe.

9. The apparatus of claim 1, wherein the BETA zeolite catalyst has a particle size 90% less than 20 µm.

10. The apparatus of claim 1, wherein the catalyst composition comprises a monolithic honeycomb carrier.

11. The apparatus of claim 10, wherein the monolithic honeycomb carrier has a density of at least approximately 60 cells psi.

12. The apparatus of claim 1, wherein the ammonia is provided to the gas stream at a ratio of at least 0.5 ppm $NH_3$/ppm $N_2O$ based on a total volume of the gas stream.

13. The apparatus of claim 12, wherein the ammonia is provided to the gas stream at a ratio of 0.8 to 1.0 ppm $NH_3$/ppm $N_2O$ based on a total volume of the gas stream.

14. A catalyst composition for ammonia-mediated removal of $N_2O$ from a gas stream comprising a BETA zeolite catalyst selective for the reduction of $N_2O$.

* * * * *